Figure 1:
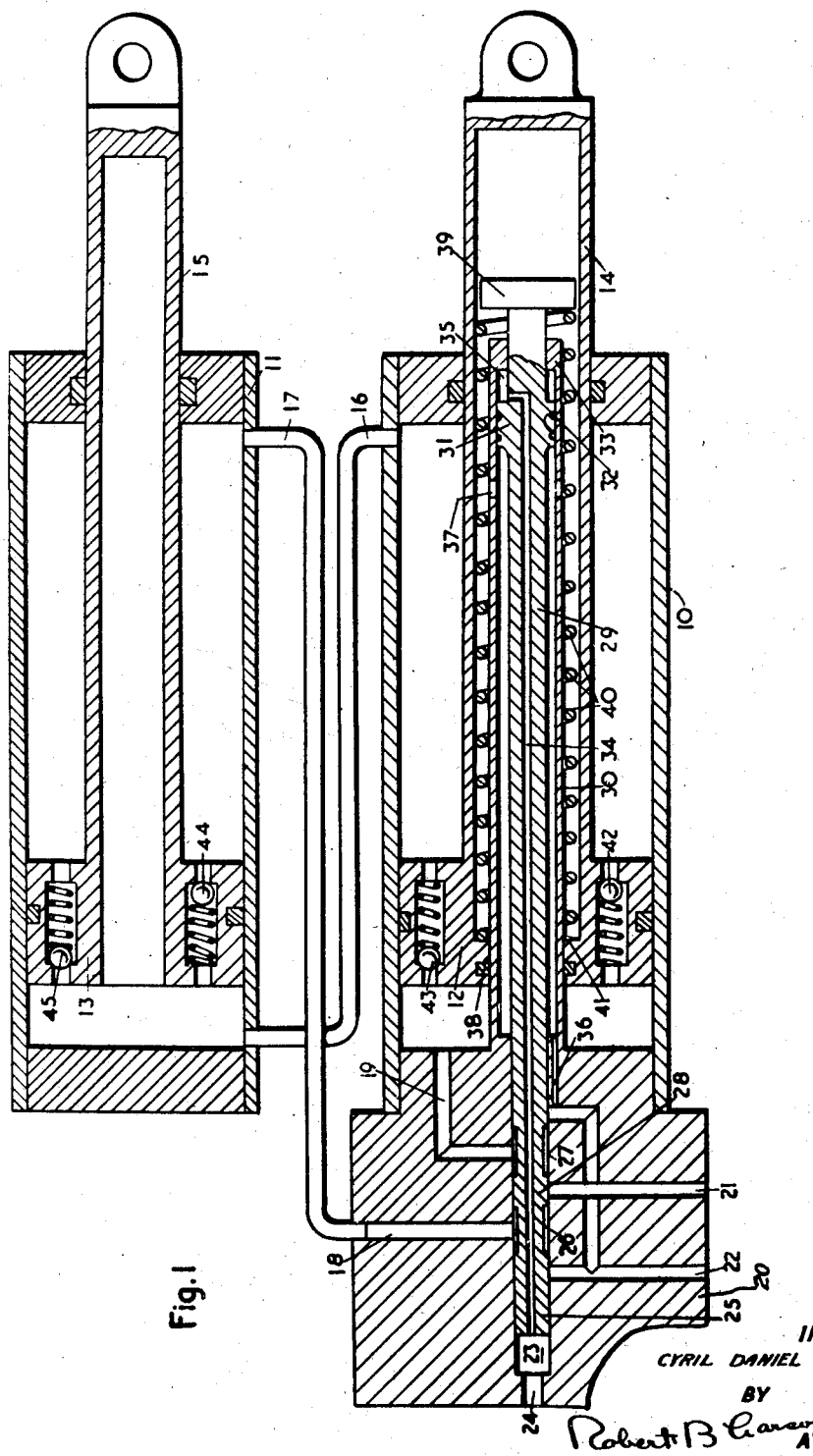

Feb. 22, 1949.  C. D. WATSON  2,462,580
HYDRAULIC VALVE AND HYDRAULIC POWER
DEVICE EMBODYING SUCH VALVES

Filed March 7, 1946  5 Sheets-Sheet 1

INVENTOR
CYRIL DANIEL WATSON.
BY
Robert B Carson
ATTORNEY

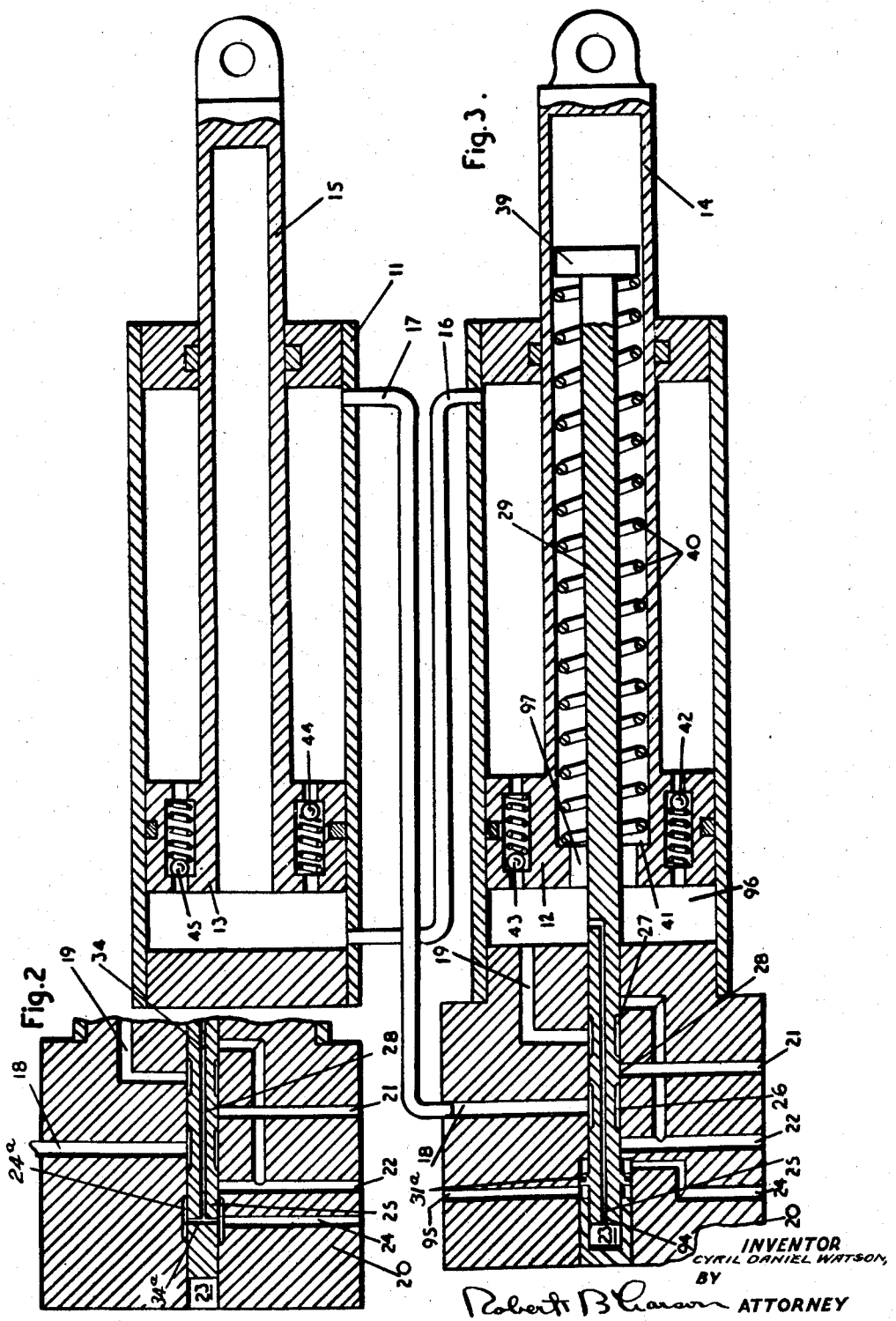

Feb. 22, 1949.  C. D. WATSON  2,462,580
HYDRAULIC VALVE AND HYDRAULIC POWER
DEVICE EMBODYING SUCH VALVES
Filed March 7, 1946  5 Sheets-Sheet 3

INVENTOR
CYRIL DANIEL WATSON,
BY
ATTORNEY

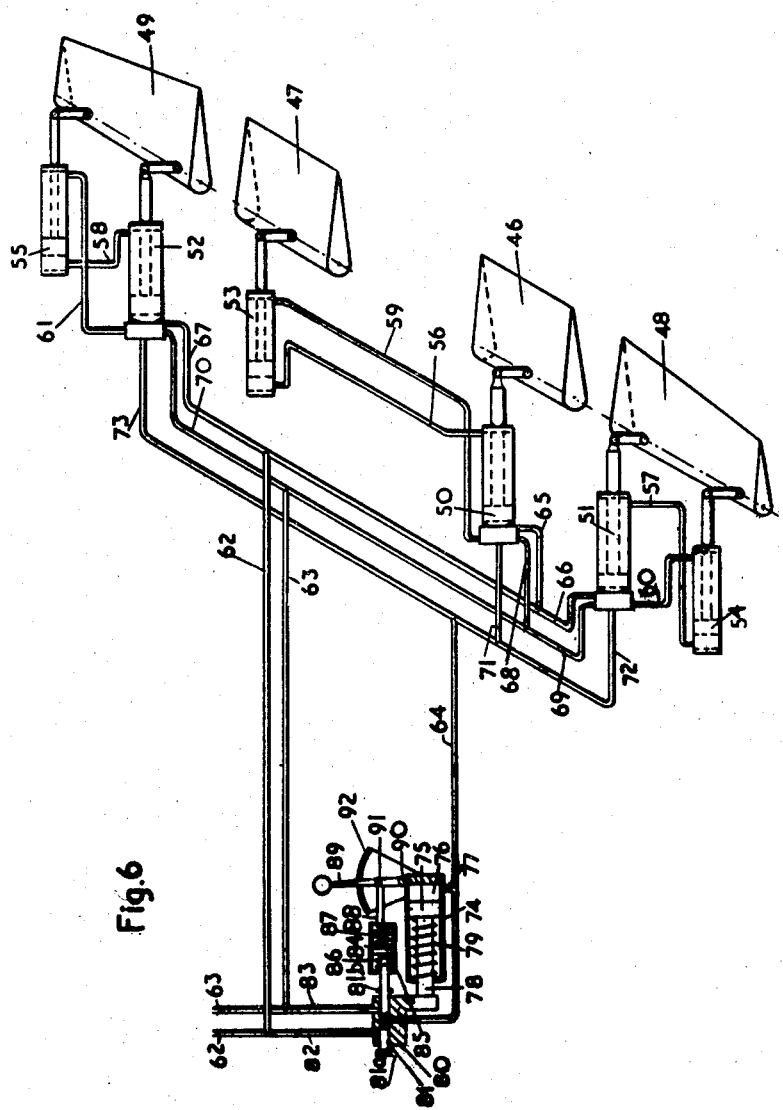

Patented Feb. 22, 1949

2,462,580

UNITED STATES PATENT OFFICE 2,462,580

HYDRAULIC VALVE AND HYDRAULIC POWER DEVICE EMBODYING SUCH VALVES

Cyril Daniel Watson, Farnborough, England
Application March 7, 1946, Serial No. 652,531
In Great Britain March 20, 1945

6 Claims. (Cl. 121—41)

This invention relates generally to hydraulic power devices.

One object of the invention is to provide in a hydraulic power device means whereby positional control of a hydraulic power element of the positive displacement type, such as a displacement pump, jack or vane motor may be effected in accordance with variations of pressure as governed by a selector device.

A further object of the invention is to provide means for effecting the positional control of a hydraulic power element of the above kind in accordance with selected variations of pressure comprising a movable member adapted to be moved by the resultant effort of a hydraulic pressure selectively controlled by suitable selector means acting against a resilient means associated with the movable component of the power element in a direction to cause the displacement of the said movable component and the associated resilient means in a direction appropriate for annulling the said resultant effort.

The resilient means preferably comprises a spring abutment which is displaced conformably with the displacement of the movable component.

Another object of the invention is to provide a valve for controlling the connections of a double acting hydraulic power element to pressure and return lines comprising a movable member subjected to the opposed efforts of a selectively controlled hydraulic pressure and a spring whose abutment is displaced conformably with the displacement of the movable component of the power element in such a manner that the resultant of said opposed efforts displaces the movable valve member in the appropriate sense for bringing about a displacement of the said movable component, and hence of the spring abutment, in the appropriate direction for annulling the said resultant effort.

A still further object of the invention is to provide a hydraulic power device comprising a jack, the piston of which is provided with a hollow piston rod and to utilize the changing volume of the interior of said rod to permit correct positioning of the piston in response to selectively controlled variations of the control pressure.

Yet another object of the invention is to provide a self-servoing valve member.

Yet another object is to provide positional selector means for operating the said device comprising a variable pressure reducing valve, for example a ball or other spring loaded valve, controlling the reduction of pressure and a selector member for varying the spring loading.

Yet another object of the invention is to provide a selector device selectively operable to regulate the pressure in the "control" pressure line for controlling the movement of a hydraulic power element of the positive displacement type comprising a positional selector control member and a cylinder communicating with the "control" pressure line and containing a spring-loaded piston, and a follow-up valve associated with the supply and return pressure lines, the said valve being actuated by the control means and by the piston and so regulating the admission and exhaustion of hydraulic fluid to and from the cylinder that the piston follows the displacement of the control member, whereby the spring loading on the piston, determining the pressure in the control line, is uniquely related to the position of the control member.

Yet a further object is to provide a hydraulic system, embodying the features of the invention, consisting of at least two hydraulic power elements connected in series for synchronous operation and in which synchronism at the end of the stroke is ensured by the provision of blow-off valves associated with the movable component of each power element.

With the above and other objects in view, reference will now be made to the accompanying drawings, forming part of the specification, which illustrate, by way of example, various forms of hydraulic power devices embodying the invention and in which:

Figure 1 is a sectional view of a pair of series operated hydraulic jacks forming power elements and one of which embodies a positional control valve in accordance with the invention, Figure 2 is a fragmentary sectional view of the head of the jack, embodying a positional control valve as shown on the lower half of Figure 1 and showing a modified arrangement of the valve.

Figure 4:
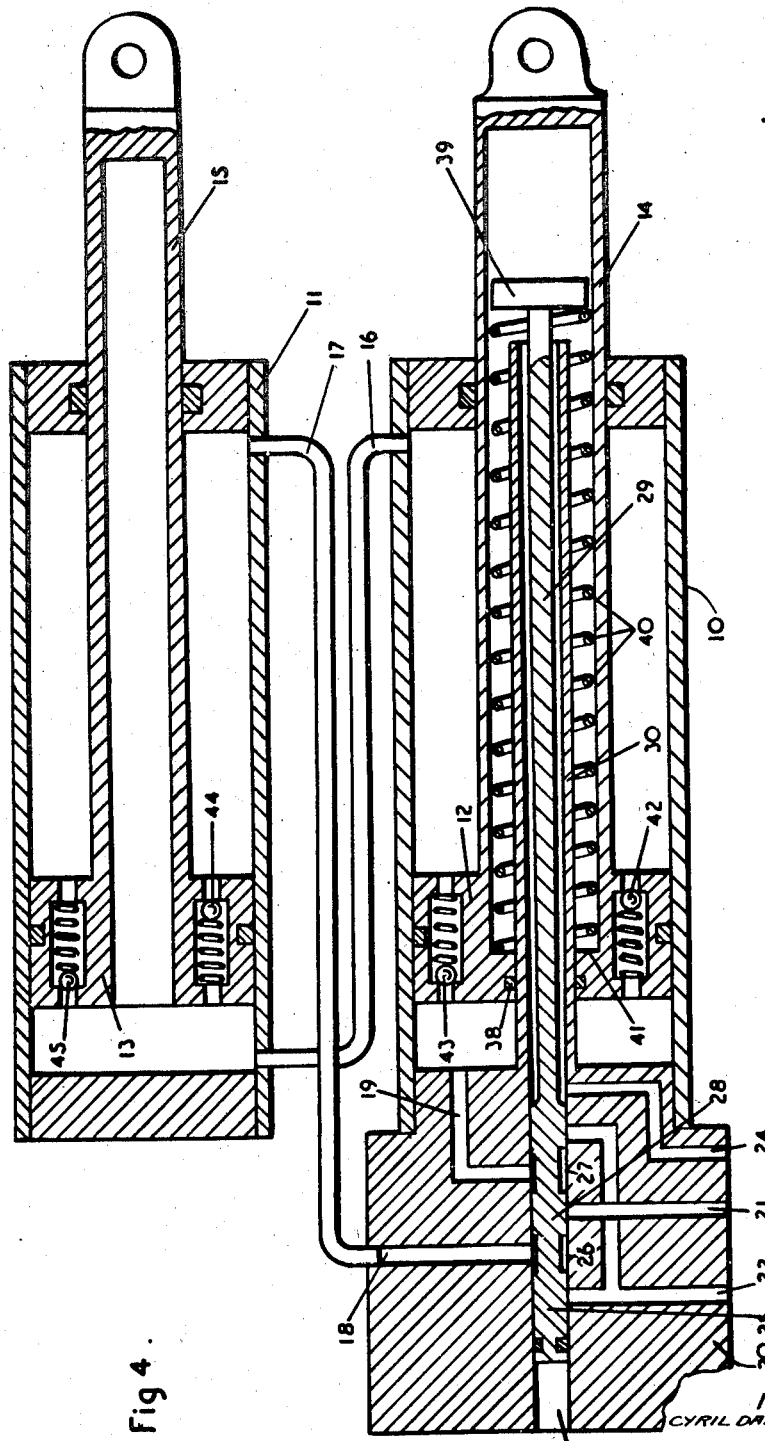
Figure 5:
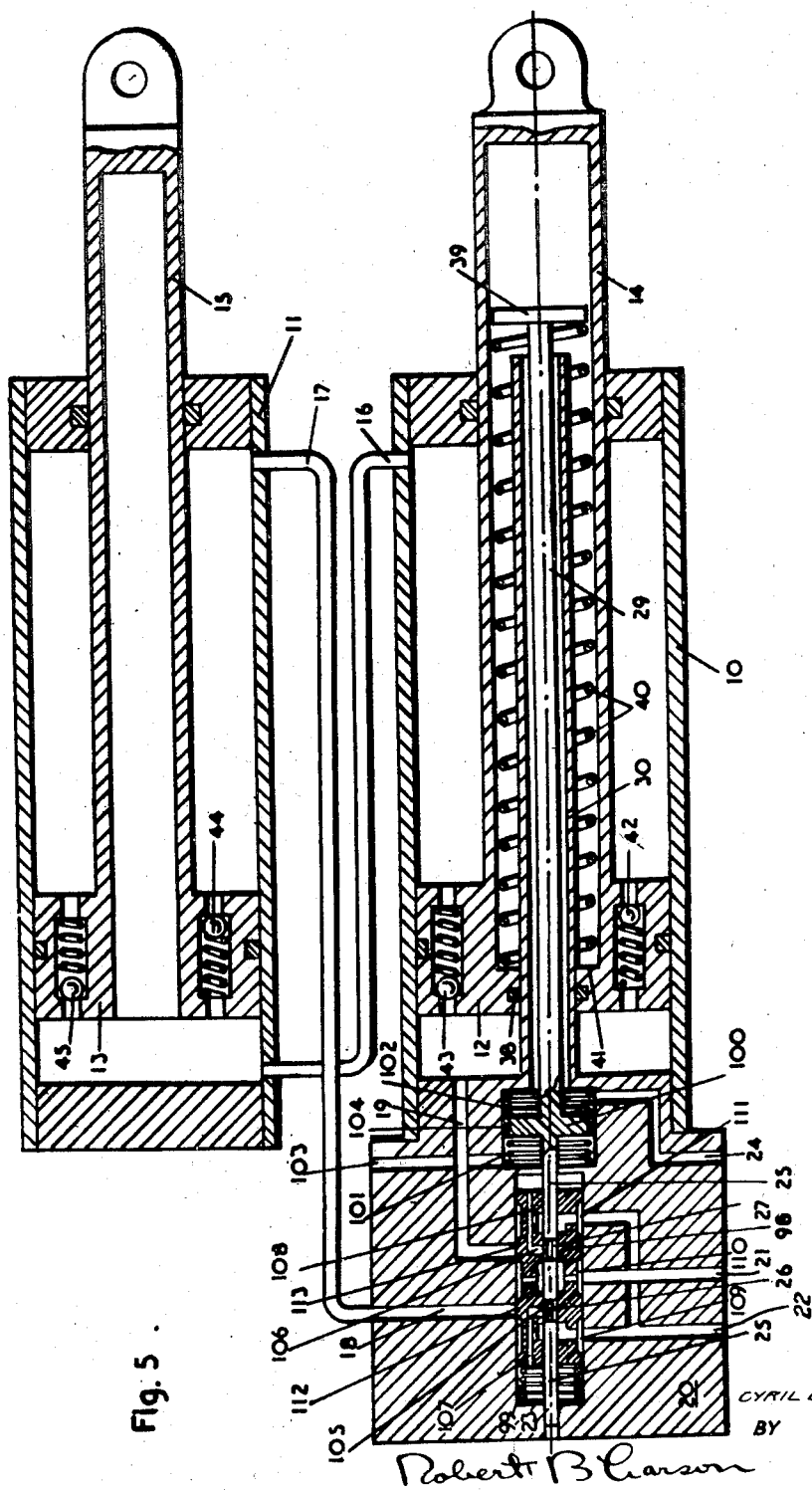

Figures 3, 4 and 5 are similar views to Figure 1 but showing respectively further modified constructions of the control valve incorporated in the lower jack, and Figure 6 shows, diagrammatically, a hydraulic flap operating system for an aircraft, comprising four independent flap sections actuated by three pairs of series operated jacks, as shown in any of Figures 1 to 5, "control" pressure selecting means and their several hydraulic connections.

In Figures 1 to 5, similar reference numerals refer to corresponding parts in the respective figures.

Referring first to Figure 1 of the drawings, there are shown two jacks 10 and 11, having pistons 12 and 13 respectively connected to hollow piston rods 14 and 15, which project through the right hand ends of the said jacks for connection to the mechanism to be operated. The space below the piston 12 of the jack 10, that is to say the right hand end of the jack 10, is hydraulically connected to the space above the piston 13 of the jack 11, that is to say the left hand end of the jack 11, by a series transfer line 16. The head 20 of the jack 10 constitutes a housing for the control valve to be hereinafter described, and has four passages formed therein, namely, a passage 18 hydraulically connected by a line 17 with the space below the piston 13 of the jack 11, a passage 19 communicating with the space above the piston 12 of the jack 10, a passage 21 connected externally to the pressure supply line (not shown) and a branched passage 22 connected externally to the return line (also not shown). The inner ends of these four passages open into a cylindrical valve chamber 23 formed in the head 20 coaxially with the jack 10 and the left hand end of the valve chamber 23 communicates with a fifth passage 24 in the head 20 having an external hydraulic connection to a line by which the "control" pressure, which is regulated by a positional selector control device, is applied. The selector device is not shown in Figure 1 but a preferred form is illustrated in Figure 6 to be hereinafter referred to.

Slidable within the valve chamber 23 is a piston valve 25 having annular grooves 26 and 27 and an intermediate land 28. The valve piston is extended to form a rod 29 which is nested coaxially within a sleeve 30 secured to the jack head 20. The sleeve 30, is, in turn, coaxially nested within the piston 12 and the piston rod 14. Near the right hand end thereof the rod 29 is enlarged, at 31, to form a plunger slidable in the sleeve 30 and provided with hydraulic seals 32. The right-hand end of the sleeve 30 is closed by a cap 33 through which projects an extension of the rod 29 to terminate in a head 39.

As will be seen, the sleeve 30, the cap 33, the plunger 31 and the extension of the rod 29 enclose an annular space 35 which is subjected to the "control" pressure through the medium of a passage 34 centrally drilled through the valve piston 25 and the rod 29. The left hand end of this passage 34 opens into the valve chamber 23 and is thereby in free communication, through the passage 24, with the "control" pressure line, and the right hand end of the passage communicates with the space 35 by means of a side drilling. Back pressure on the face of the plunger 31 opposite to the space 35 is relieved by venting the clearance between the sleeve 30 and the rod 29 to one branch of the "return" passage 22 through a drilling 36 in the head 20.

The jack piston 12 slides on the sleeve 30, being provided with a hydraulic seal 38 to prevent leakage of fluid past the piston 12.

Between the outside of the sleeve 30 and the inside of the piston rod 14 is a clearance which is occupied by helical compression spring 40, the right end of which abuts on the head 39 of the rod 29 and the left hand end of which abuts on an internal shoulder 41 formed in the piston 12.

The pistons 12 and 13 are also provided with blow-off valves 42, 43, 44 and 45 respectively, the purpose of which will hereinafter be referred to.

The above described mechanism operates in the following manner:

Admission of the "control" pressure to the space 35 behind the plunger 31 tends to move the rod 29 and the valve piston 25 to the left, so as to establish communication, through the annular groove 27, between the passage 21 carrying the operating pressure and the passage 19 communicating with the space above the piston 12 of the jack 10; at the same time, the annular groove 26 establishes communication between the left hand branch of the passage 22 and the passage 18, thus placing the space below the piston 13 of the jack 11 in communication with the return circuit via the line 17. Since the series transfer line 16 is always open, pressure will be applied above both the pistons 12 and 13, causing them to move to the right.

The effort of the "control" pressure in the space 35 acting on the back of the plunger 31 is, however, opposed by the effort of the spring 40 acting on the head 39, and, as the piston 12 moves to the right, the spring 40 is compressed, thus increasing its effort on the head 39 until a balance is struck between the "control" pressure and the spring effort. When this occurs the valve piston 25, 29 will move to the right until the land 28 and the left hand end of the piston valve 25 close the passages 21 and 22 and thereby hydraulically lock the system. If the control pressure, applied through the passage 24, is then increased (by the selector device), the effort of the spring 40 will again be overcome and the valve piston will move to the left so as to connect the space above the jack 12 and below the jack 13 to pressure and return respectively, as before, thus causing the pistons 12 and 13 to move further to the right, until balance is again established between the opposed hydraulic and spring forces acting on the valve piston 25, 29. Conversely, if the control pressure is reduced, the action will be reversed, (the pressure circuit being now established through the annular groove 26 and the passage 18, and the return circuit through the passage 19, the annular groove 27 and the right-hand branch of the passage 22), and the piston 12 and 13 will move to the left, until balance is again established between the hydraulic and spring forces acting on the valve piston 25, 29, when the system will again become locked through the valve piston moving into the neutral position and closing the passages 21 and 22.

It will, therefore, be appreciated that, for every selected value of the "control" pressure, there corresponds a definite position of the piston 12 along its stroke in which the spring 40 is just sufficiently compressed to balance the "control" pressure applied to the valve piston and maintain the latter in equilibrium in its neutral position. Therefore, the position of the piston 12 along its stroke can be uniquely selected by selecting the appropriate "control" pressure to be applied through the passage 24.

As long as the series transfer line 16 is full of fluid and is maintained under pressure, the piston 13 will exactly follow the movements of the piston 12 and when the system is hydraulically locked in mid-stroke, by the control valve 25, 29 being in its neutral position, the piston 13 will maintain its correct relationship with respect to the piston 12, provided there is no leakage past the piston seals. Perfect synchronism of the pistons 12 and 13 is obtained at the ends of the stroke by the provision of blow-off valves 42, 43, 44 and 45 in the manner described in the specification accompanying my copending patent application Serial No. 652,530 filed March 7, 1946, applied for jointly with Reginald Charles Samuel Mansell, but now abandoned. If lack of synchronism develops when the system is locked for a prolonged period in mid-stroke, owing to leakage past the piston seals, synchronism can be readily restored by bringing the system to one end or the other of its stroke and returning it again to the desired mid-stroke position.

In the modified arrangement shown in Figure 2, the construction of the valve is the same as that shown in Figure 1 except that the passage 24 carrying the "control" pressure communicates with an annular recess 24a surrounding the left hand end of the piston valve 25, and the control bore 34 communicates through a ported cross passage 34a with the annular recess 24a. This arrangement is advantageous in that it increases the effective area on which the "control" pressure acts. In the construction shown in Figure 1, the "control" pressure, supplied through the passage 24, is not only applied to the right hand end of the piston 31, by the passage 34, but is also applied in the opposite direction to the end of the valve 25 in the valve chamber 23, so that the effective area for moving the valve 25 is the difference between the annular area of the piston 31 and the area of the end of the valve 25. Since, however, a back pressure may momentarily be built up on the face of the piston 31 opposite to the space 35, it is desirable to increase the effective area on which the "control" pressure acts, and this is obtained by the arrangement shown in Figure 2.

A further modification is shown in Figure 3. In this arrangement, the operating piston, indicated at 31a, of the valve rod is arranged in an enlargement of the bore of the valve body 20. Balance of the back pressure is obtained through a central bore 94 in the valve rod 25, 29 providing communication between the space 23 at the left hand end of the valve rod and the space 96 at the left hand side of the piston 12. The space 96 is, in this arrangement, in communication with the interior of the jack rod 14 through an opening 97, which has the advantage that the whole area of the jack piston 12 is available for the application of the operating pressure for movement of the jack from left to right.

A passage 95 communicating with an additional external line is provided for exhausting the space behind, that is to say, to the left of, the control piston 31a.

The provision of an additional external line, such as is required in the arrangement just described in connection with Figure 3, is avoided in the construction of the valve shown in Figure 4, which construction offers the further advantage that the changing volume of the interior of the jack piston rod 14, as the jack piston travels along its stroke, is utilised to promote correct positioning of the jack piston in response to selectively controlled variations of the "control" pressure. As shown in Figure 4, the piston valve 25 is of larger diameter than the rod 29 and the "control" pressure is supplied through the passage 24 to the right hand end of the valve 25 where it acts over the whole of the area of the piston valve 25. There is no central bore in the valve 25 or in the rod 29 and the left hand end thereof in the space 23 is open to atmosphere. The space between the tube 30 and the valve rod 29 is open to the interior of the jack piston rod 14 which is, therefore, under the "control" pressure. When the selected "control" pressure is altered, the valve 25 acts, as before, to enable the jack piston to be moved until the "control" pressure on the valve 25 is balanced by the action of the spring 40 and, during this movement, the volume of the interior of the jack piston rod 14 is altered, so that a considerable volume of fluid has to be passed through the supply passage 24 and this exercises a "volume" control over the rate of movement of the piston 12, thereby ensuring a greater accuracy in the positioning of the latter when the condition of equilibrium is restored. With this arrangement there is no back pressure acting on the valve.

A still further modified arrangement is illustrated in Figure 5, the valve being, in this case, a self-servoing valve. The valve portion of the rod 25, 29 slides within a valve sleeve 98 which is formed with ports 105 and 106 communicating, through passages 107 and 108 respectively, with opposite ends of the valve sleeve, which, when the valve portion of rod 25 is moved, are opened by the grooves 26 and 27, one to the passage 21 and the other to the branched passage 22, to cause pressure fluid to be passed to one end of the said valve sleeve and to be exhausted from the other end, so that the valve sleeve follows the movement of the valve portion of rod 25. The valve sleeve 98 is formed with annular grooves 109, 110 and 111, with intermediate lands 112 and 113, controlling the ports connected with the passages 18, 19, 21 and 22 in the same way as the valve portion of rod 25 in the previously described constructions and a spring 99 is provided to stabilize the sleeve in the position in which the said ports are closed, with pressure at the right hand end of the sleeve 98 balancing the spring load, when the jack is stationary. In order to increase the effectiveness of the action of the "control" pressure, the valve stem 25, 29 is provided, in the arrangement shown in this figure, with a piston 100 sliding in an enlargement of the valve body 20, and springs 101 and 102 acting on either face of the piston 100. The "control" pressure is fed to the right hand face of this piston 100 through the passage 24 and the space, to the left of the piston 100, is connected to the atmosphere through a passage 103. Leakage of pressure fluid past the piston 100 is prevented by a hydraulic seal 104.

The arrangement, by enabling the diameter of the valve portion of the rod 25, 29 to be made very small, minimises the effects of friction whilst the diameter of the valve sleeve 98 can be made large enough for the passages, conveying the fluid for actually operating the jack, to be made of generous dimensions. It is to be understood, however, that the piston 100 may be omitted and, instead, any of the means described in connection with the previous arrangements shown in Figures 1–4, for applying the "control" pressure to the valve, may, if desired, be employed.

The self-servoing action of the valve, herein described, greatly increases the accuracy with which the jack piston 12 is positioned corresponding to any selected "control" pressure.

Referring now to Figure 6, this figure illustrates the application of series operated jacks with selective pressure-responsive positional control, as illustrated in, and described with reference to, any of the preceding figures, to an aircraft flap system having four independent flap sections operated by three pairs of series operated jacks. A flap arrangement of this kind is particularly suitable for a folding wing aircraft in which two inboard flap sections are separated from two outboard flap sections by the wing folding hinges.

In the figure, the port and starboard inboard flap sections are shown at 46 and 47 respectively and the port and starboard outboard flap sections at 48 and 49 respectively. These flap sections are operated through levers by three pairs of series operated jacks, each pair being similar to a pair of jacks 10 and 11 shown in Figures 1, 3, 4 or 5, and having similar control arrangements. The three "master" jacks 50, 51 and 52 are constructed similarly to the jack 10 and the three "slave" jacks 53, 54 and 55 are constructed similarly to the jack 11 of those figures. One pair 50 and 53 of series operated jacks are applied to the inboard flap sections 46 and 47, the jack 50 operating the flap section 46 and the jack 53 operating the flap section 47; the second pair of series operated jacks 51 and 54 are applied to the port outboard flap section 48 and the third pair of series operated jacks 52 and 55 are applied to the starboard outboard flap section 49.

The master and slave jacks of each pair are respectively interconnected by series transfer lines 56, 57 and 58 corresponding to the series transfer line 16 of the previous figures. The lower ends of the slave jacks 53, 54 and 55 are connected with the heads of their master jacks 50, 51 and 52 by hydraulic lines 59, 60 and 61 corresponding to the line 17 of the aforesaid figures.

Each master jack has three external hydraulic connections corresponding respectively to the connections of the passages 21, 22 and 24, of which passages 21 carries the main supply pressure, 22 is connected to the return line and 24 carries the "control" pressure. The supply pressure connections of the three master jacks are indicated at 65, 66 and 67, the return line connections are indicated at 68, 69 and 70 and the "control" pressure connections at 71, 72 and 73. The supply pressure connections 65, 66 and 67 are branched from a common supply pressure line 62, the return pressure connections 68, 69 and 70 are branched from a common return line 63 and the control pressure connections 71, 72 and 73 are branched from a common control pressure line 64. It will, therefore, be seen that the three pairs of jacks are operated in parallel.

The pressure in the control line 64 is regulated by a positional selector device comprising a fixed cylinder 74 containing a slidable piston 75, the cylinder space 76, above the head of the piston 75, being in communication with the control pressure line 64 through a branch line 77. The rear of the piston 75 is loaded by means of a helical compression spring 79 and the piston is provided with a piston rod 78 which extends outside the cylinder, the outer end of the rod 78 having connected thereto a valve body 80 in which is slidable a piston valve member 81 provided with adjustable stops 81a and 81b. The valve body 80 is provided with three external ports connected respectively to the "control" pressure line 64 and the lines 82 and 83 which are respectively branches of the aforesaid common supply pressure line 62 and the aforesaid common return line 63. The valve member has a single annulus serving to connect the "control" pressure line 64 either with the supply pressure line 82 or with the return line 83 according to the position of the valve member 81 relative to the valve body 80; in the neutral position of the valve member, both lines 82 and 83 are shut-off from the "control" pressure line 64. The stem of the valve member 81 carries a head 84 enclosed in a spring box 85 having buffer springs 86 and 87 on both sides of the head 84. A rod 88, formed integral with the spring box 85, is pivoted at 91 to a selector lever 89 which is mounted on a fixed pivot 90 and works in a quadrant 92 provided with suitable notches for locating the said selector lever 89.

Movement of the selector lever 89 in either direction is communicated, through the rod 88, the spring box 85, the buffer springs 86 and 87 and the head 84, to the valve member 81, which is, thereby, shifted to put the "control" pressure line 64 in communication with the supply pressure line 82 or the return line 83, according to the direction of movement of the selector lever. The consequent variation of pressure in the "control" pressure line 64 is communicated to the cylinder space 76 by the branch line 77, causing the piston 75, the rod 78 and the valve body 80 to be displaced in the direction appropriate for cancelling the movement of the valve member 81 relative to the valve body 80. The permissible relative movement between the valve member 81 and the valve body 80 is small, being limited by the stops 81a and 81b and, if the selector lever 89 is displaced to a considerable extent, the lost motion between it and the valve member 81 is initially taken up by the springs 86 and 87; as, however, the piston 75 and the valve body 80 move under the influence of the changing pressure in the space 76, the valve member 81 follows up this movement and takes up the lost motion between it and the selector lever 89 until the springs 86 and 87, in the spring box 85, are in equilibrium, after which further movement of the piston 75 brings the valve body 80 into the neutral position relative to the valve member 81, thus cutting off the control pressure line 64 from the supply or return line, as the case may be, and stabilizing the pressure therein and in the cylinder space 76. It will be appreciated that, when the system is stabilised, the piston 75 is in equilibrium under the opposed efforts of the pressure in the "control" pressure line and the compression spring 79, so that the pressure in the "control" pressure line corresponds to the degree of compression of the spring 79; the latter corresponds to the position of the piston 75, the rod 78 and the valve body 80 relative to the fixed cylinder 74 and this is determined by the position of the valve member 81, 84, the spring box 85 and the rod 88 and hence by the position of the selector lever 89. It, therefore, follows that the position of the selector lever 89 determines the pressure established in the "control" pressure line 64 and this, in turn, by means of the control valves incorporated in the master jacks, as hereinbefore described with reference to Figures 1-5, determines the position of the jack pistons and consequently the setting of the flaps.

The rate at which pressure builds up, or is let down, in the "control" pressure line 64, and, therefore, the rate at which the pistons of the flap operating jacks are moved, depends on the discharge rate of the valve unit 80, 81. This depends on the maximum port openings of the valve unit 80, 81, which are determined by the stops 81a and 81b; the rate of operation of the whole system can, therefore, be regulated by suitably adjusting the stops 81a, 81b, and, by applying different adjustments to the said stops 81a, 81b, the rate of operation of the whole system for the two opposed directions of motion, namely, the raising and lowering of the flaps 46—49, may be made to differ so that any desired timing for raising and lowering the said flaps respectively may be imposed. Any seepage in the "control" pressure circuit, for example past the piston 75 or within the control valves of the flap operating jacks, is compensated by the valve unit 80, 81 remaining slightly "selected" that is to say slightly "off" the neutral position so that the seepage is made up by a trickle discharge through the valve unit 80, 81. The above-mentioned relative displacement of the valve unit 80, 81 from the neutral position and the consequent displacement of the equilibrium position of the piston 75, relative to the selector lever 89, is of a very small order and has no material effect on the pressure established in the "control" pressure line for a given position of the said selector lever, because the total relative movement of the valve body 80 and the valve member 81, as defined by the stops 81a and 81b, is quite small in comparison with the total travel of the piston 75 in the cylinder 74. The valve unit 80, 81 will, therefore, compensate for seepage in any part of the "control" pressure circuit regardless of the rate of seepage, provided the latter is less than the full discharge rate of the said valve unit 80, 81, without substantial detriment to the accuracy of positional selection, but the greater is the rate of seepage the more sluggishly will the system operate. This, however, can be corrected by readjusting the stops 81a and 81b (within the limits of their effective adjustability) to give a quicker rate of operation.

Although the discharge rate of the valve unit 80, 81 determines the rate of displacement of the selector piston 75, and hence of the valve assembly 80, 81 and 84, the resilient connection, provided by the spring box 85 and its contained springs 86 and 87, enables the selector lever 89 to be moved as quickly as may be desired. To enable the selector lever to be so moved throughout its complete range, the spring box 85 must accommodate the full range of movement of the selector lever 89 without coil binding of the said springs 86 and 87 contained therein.

I claim:

1. A device of the kind referred to comprising in combination: a hydraulic jack; a movable piston and a hollow piston rod in said jack; an abutment on said piston; a head on said jack, said head having a bore therein; a sleeve on said head, said sleeve extending within the body of said jack and said piston sliding on, and said hollow piston rod surrounding, said sleeve; a movable valve member slidable in said bore in said head for controlling the supply of pressure fluid to said jack; a rod-like extension on said valve member slidable within said sleeve; an abutment on the rear end of said rod-like extension; a spring located within said hollow piston rod and surrounding said sleeve, said spring bearing at one end against said piston abutment and at the other end against said abutment on said extension, and means for applying a selectively controlled hydraulic pressure to said valve member against the action of said spring whereby the resultant effort applied to said extension moves said valve member in a direction to cause displacement of said piston and said piston abutment in a direction appropriate for annulling said resultant effort.

2. A device of the kind referred to comprising in combination: a hydraulic jack; a movable piston and a hollow piston rod in said jack; an abutment on said piston; a head on said jack, said head having a bore therein; sleeve on said head, said sleeve extending within the body of said jack and said piston sliding on, and said hollow piston rod surrounding, said sleeve; a movable valve member slidable in said bore in said head for controlling the supply of pressure fluid to said jack; a rod-like extension on said valve member, said extension having a smaller diameter than the internal diameter of, and being slidable within, said sleeve; a piston element located adjacent the rear end of said extension, and said valve member and said extension having a bore therein extending from the front thereof to the rear of said piston element; an abutment on the rear end of said extension; a spring located within said hollow piston rod and surrounding said sleeve, said spring bearing at one end against said piston abutment and at the other end against said abutment on said extension, and means for applying a selectively controlled hydraulic pressure through said bore to the rear of said piston element on said extension against the action of said spring whereby the resultant effort applied to said piston element moves said valve member in a direction to cause displacement of said jack piston and said piston abutment in a direction appropriate for annulling said resultant effort.

3. A device of the kind referred to comprising in combination: a hydraulic jack; a movable piston and a hollow piston rod in said jack; an abutment on said piston; a head on said jack, said head having a bore therein; a sleeve on said head, said sleeve extending within the body of said jack and said piston sliding on, and said hollow piston rod surrounding, said sleeve; a movable valve member slidable in said bore in said head for controlling the supply of pressure fluid to said jack; a rod-like extension on said valve member slidable within said sleeve, and having a bore therein, said bore in said extension being in communication with an annular recess formed by an enlargement of said bore in said head; an abutment on the rear end of said rod-like extension; a spring located within said hollow piston rod and surrounding said sleeve, said spring bearing at one end against said piston abutment and at the other end against said abutment on said extension, and means for applying a hydraulic pressure through said annular recess and said bore in said extension to the rear of said piston element on said extension against the action of said spring whereby the resultant effort applied to said piston element moves said valve member in a direction to cause displacement of said jack piston and said piston abutment in a direction appropriate for annulling said resultant effort.

4. A device of the kind referred to comprising in combination: a hydraulic jack, a movable piston and hollow piston rod therein; an abutment on said piston; a head on said jack, said head having a bore therein; a sleeve on said head, said sleeve extending within the body of the jack and said piston sliding on, and said hollow piston rod surrounding, said sleeve; a movable valve member slidable within said head for controlling the supply of pressure fluid to said jack; a rod-like extension on said valve member, said extension being of smaller diameter than the diameter of said valve member, whereby said valve member, constitutes a piston element, and said extension extending within said sleeve and being of smaller diameter than the interior of said sleeve, so as to leave an annular space therebetween open to the interior of said piston rod; an abutment on the rear end of said extension; a spring located within said hollow piston rod and surrounding said sleeve, said spring bearing at one end against said piston abutment and at the other end against said abutment on said extension, and means for applying a hydraulic pressure to the rear of said valve piston element against the action of said spring whereby the resultant effort applied to said valve piston moves said valve member in a direction to cause displacement of said jack piston and said spring abutment thereon in a direction appropriate for annulling said resultant effort.

5. A device of the kind referred to comprising in combination: a hydraulic power element having a movable component therein; a valve body associated with said power element, said valve body having a bore therein; a movable valve member, for controlling the supply of main pressure fluid to said power element, slidable in said bore, said valve member comprising valve portion proper and a valve sleeve within which said valve portion is slidable and said sleeve having a pair of passages and associated ports therein connecting the bore of said sleeve with the opposite ends of said sleeve respectively; a resilient means associated with said movable component and said movable valve member, and means for applying a hydraulic pressure to said valve member in a direction opposed to the effort of said resilient means whereby, on movement of said valve member under the resultant effort applied thereto, said ports and passageways are put into communication with said main pressure fluid supply whereby pressure fluid is passed to one end of said sleeve and exhausted from the other to cause the said sleeve to follow the movement of said valve portion and the arrangement being such that the resultant effort applied to said valve member moves said valve sleeve in a direction to cause displacement of said movable component and said resilient means in a direction appropriate for annulling said resilient effort.

6. A device according to claim 5 and including a piston on said valve portion, said piston being located in, and slidable within, an enlargement of said valve body and against one side of which the hydraulic pressure is applied, for the purpose specified.

CYRIL DANIEL WATSON.

REFERENCES CITED

The following references are of record in the file of this patent:

UNITED STATES PATENTS

| Number | Name | Date |
| --- | --- | --- |
| 1,231,257 | Herr | June 26, 1917 |
| 2,121,389 | Morin | June 21, 1938 |
| 2,243,781 | Thornhill | May 27, 1941 |
| 2,344,768 | Dodson | Mar. 21, 1944 |
| 2,411,748 | Kelley | Nov. 26, 1946 |

FOREIGN PATENTS

| Number | Country | Date |
| --- | --- | --- |
| 476,341 | Great Britain | Dec. 7, 1937 |
| 517,314 | Great Britain | Jan. 26, 1940 |